United States Patent
Fukuda et al.

(10) Patent No.: US 10,982,072 B2
(45) Date of Patent: Apr. 20, 2021

(54) PARTICULATE NUCLEATING AGENT, RESIN COMPOSITION, MOLDED PRODUCT, AND PRODUCTION METHOD THEREOF

(71) Applicant: ADEKA CORPORATION, Tokyo (JP)

(72) Inventors: Takuya Fukuda, Tokyo (JP); Yuri Yokota, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 16/609,832

(22) PCT Filed: Jan. 28, 2019

(86) PCT No.: PCT/JP2019/002781
§ 371 (c)(1),
(2) Date: Oct. 31, 2019

(87) PCT Pub. No.: WO2020/008668
PCT Pub. Date: Jan. 9, 2020

(65) Prior Publication Data
US 2020/0207950 A1  Jul. 2, 2020

(30) Foreign Application Priority Data
Jul. 4, 2018  (JP) .............................. JP2018-127626

(51) Int. Cl.
*C08K 5/527* (2006.01)
*C08K 5/17* (2006.01)
*C08L 23/02* (2006.01)

(52) U.S. Cl.
CPC ................ *C08K 5/527* (2013.01); *C08K 5/17* (2013.01); *C08L 23/02* (2013.01); *C08L 2205/24* (2013.01)

(58) Field of Classification Search
CPC ............ C08K 5/17; C08K 5/527; C08L 23/02
See application file for complete search history.

(56) References Cited

U.S. PATENT DOCUMENTS

| | | |
|---|---|---|
| 7,714,046 B2 | 5/2010 | Ishii et al. |
| 10,131,751 B2 | 11/2018 | Lake et al. |
| 2003/0236329 A1 | 12/2003 | Kawamoto et al. |
| 2009/0156744 A1 | 6/2009 | Ishii et al. |
| 2014/0179846 A1 | 6/2014 | Lake et al. |
| 2017/0088678 A1 | 3/2017 | Lake et al. |

FOREIGN PATENT DOCUMENTS

| | | | |
|---|---|---|---|
| CN | 10-1367833 B | * | 8/2007 |
| JP | 09-176393 | | 7/1997 |
| JP | 11-335504 | | 12/1999 |
| JP | 2004-083852 | | 3/2004 |
| JP | 2005-120237 | | 5/2005 |
| JP | 2007-297465 | | 11/2007 |
| JP | 2011-219519 | | 11/2011 |
| JP | 2017-149962 | | 8/2017 |
| WO | 2007/039997 | | 4/2007 |

OTHER PUBLICATIONS

Official Communication issued in International Application No. PCT/JP2019/002781, dated Mar. 12, 2019.

* cited by examiner

*Primary Examiner* — Robert D Harlan
(74) *Attorney, Agent, or Firm* — Greenblum & Bernstein, P.L.C.

(57) ABSTRACT

A particulate nucleating agent of the present invention is a particulate nucleating agent including a predetermined aromatic phosphate metal salt, in which a content of aliphatic amine is equal to or more than 3 ppm and equal to or less than 190 ppm based on a mass of the entirety of the particulate nucleating agent.

12 Claims, 1 Drawing Sheet

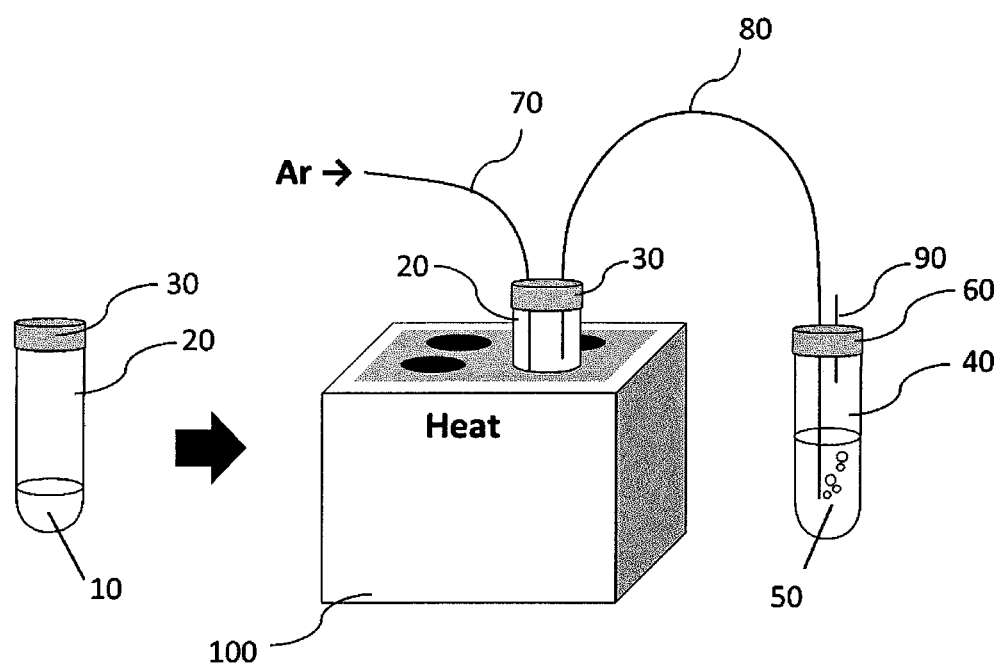

PARTICULATE NUCLEATING AGENT, RESIN COMPOSITION, MOLDED PRODUCT, AND PRODUCTION METHOD THEREOF

TECHNICAL FIELD

The present invention relates to a particulate nucleating agent, a resin composition, a molded product, and a production method thereof.

BACKGROUND ART

As a modification technique of a polymer material, a technique of adding a crystal nucleating agent or a crystallization accelerator is known. As such a kind of technique, a technique disclosed in Patent Document 1 is known, for example. Patent Document 1 discloses that a nucleating agent (hereinafter, the crystal nucleating agent, the crystallization accelerator, and a clarifying agent are collectively referred to as "nucleating agent") is added to a thermoplastic polymer (claim 1 of Patent Document 1 and the like). In the document, a phosphoric acid ester salt is exemplified as a nucleating agent (paragraph 0014 of Citation 1).

RELATED DOCUMENT

Patent Document

[Patent Document 1] Japanese Unexamined Patent Publication No. 2017-149962

SUMMARY OF THE INVENTION

However, as a result of examination by the present inventors, it was determined that there was room for improvement in terms of feed reliability and odorous properties in the nucleating agent disclosed in Patent Document 1.

Solution to Problem

As a result of examination by the present inventors, the following finding was obtained.

A general particulate nucleating agent as a particulate body is added to a thermoplastic resin and melt-kneaded, and used in a heating and molding process of the thermoplastic resin. However, there was a concern that feed reliability would deteriorate due to the influence of various powder physical properties of the particulate nucleating agent. If feed reliability deteriorates, production reliability at the time of molding process deteriorates.

As a result of the examination considering such circumstances, it was found that it is possible to improve feed reliability by causing the particulate nucleating agent to contain aliphatic amine. However, it was understood that in a case where an excessive amount of aliphatic amine is contained, the odor becomes strong during storage and working becomes difficult.

The present inventors further performed examination based on the finding and found that it is possible to enhance feed reliability and reduce odor by setting a content of aliphatic amine in the particulate nucleating agent within an appropriate numerical value range, thereby completing the present invention.

According to the present invention, there is provided a particulate nucleating agent including a compound represented by the following General Formula (1), in which a content of aliphatic amine in the particulate nucleating agent obtained by measurement of Procedure A shown below is equal to or more than 3 ppm and equal to or less than 190 ppm based on a mass of the entirety of the particulate nucleating agent.

(Procedure A)

4 g of the particulate nucleating agent is put into a test tube for particulate nucleating agent introduction made of glass (outer diameter 30 mm×length 200 mm).

In the test tube for particulate nucleating agent introduction, argon gas is introduced under a condition of 37 mL/min for 5 minutes, and then while introducing argon gas at 37 mL/min, in an argon gas atmosphere, the test tube for particulate nucleating agent introduction is heated under a condition of 180° C. and 2 hours.

A vaporized matter generated by heating is collected in 6 mL of a 600 mg/L methane sulfonic acid aqueous solution in a collection test tube made of glass (outer diameter 15 mm×length 150 mm). The methane sulfonic acid aqueous solution is messed up to 10 mL with a 600 mg/L methane sulfonic acid aqueous solution to prepare a measurement sample.

A concentration of aliphatic amine in the obtained measurement sample is measured by using an ion chromatography method.

A content (ppm) of the aliphatic amine based on a mass of the entirety of the particulate nucleating agent is calculated based on the obtained measurement value.

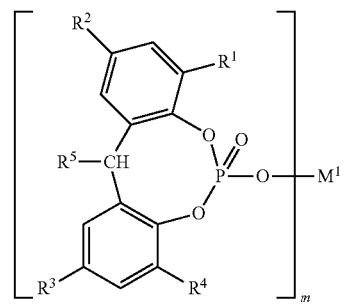

(1)

(In General Formula (1), $R^1$ to $R^4$ each independently represent a hydrogen atom and a straight chain or branched alkyl group having 1 to 9 carbon atoms, $R^5$ represents a hydrogen atom or an alkyl group having 1 to 4 carbon atoms, m represents 1 or 2, in a case where m is 1, $M^1$ represents a hydrogen atom or an alkali metal atom, and in a case where m is 2, $M^1$ represents a group 2 element, Al (OH) or Zn.)

In addition, according to the present invention, a resin composition obtained by causing the particulate nucleating agent to be contained in a thermoplastic resin is provided.

In addition, according to the present invention, a molded product obtained by using the resin composition is provided.

In addition, according to the present invention, a production method of producing a molded product by using the resin composition is provided.

According to the present invention, a particulate nucleating agent excellent in feed reliability and low odorous properties, a resin composition using thereof, a molded product, and a production method thereof are provided.

BRIEF DESCRIPTION OF THE DRAWINGS

The object, other objects thereof, features, and advantages become further apparent by appropriate embodiments described below and the following drawings accompanied thereto.

FIG. 1 is a drawing for describing a gist of a measurement method of an amine amount.

DESCRIPTION OF EMBODIMENTS

A particulate nucleating agent of the present embodiment is described.

The particulate nucleating agent contains an aromatic phosphate metal salt. As the aromatic phosphate metal salt, a compound represented by the following General Formula (1) is used. The compound may be used alone, or two or more thereof may be used by being combined together.

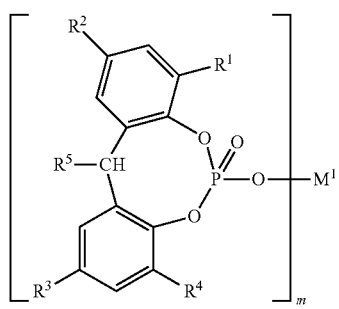
(1)

In the following General Formula (1), $R^1$ to $R^4$ each independently represents a hydrogen atom, a straight chain or branched alkyl group having 1 to 9 carbon atoms, $R^5$ represents a hydrogen atom or an alkyl group having 1 to 4 carbon atoms, m represents 1 or 2, in a case where m is 1, $M^1$ represents a hydrogen atom or an alkali metal atom, and in a case where m is 2, $M^1$ represents a group 2 element and Al (OH) or Zn.

Examples of an alkyl group having 1 to 9 carbon atoms represented by $R^1$, $R^2$, $R^3$, and $R^4$ in the following General Formula (1) include a methyl group, an ethyl group, a propyl group, an isopropyl group, a butyl group, a sec-butyl group, a tert-butyl group, an isobutyl group, an amyl group, an isoamyl group, a tert-amyl group, an hexyl group, a cyclohexyl group, a heptyl group, an isoheptyl group, and a tert-heptyl group.

In the following General Formula (1), examples of an alkali metal represented by $M^1$ include sodium (Na), potassium (K), lithium (Li), and the like.

Examples of a group 2 element represented by $M^1$ in the following General Formula (1) include beryllium (Be), magnesium (Mg), calcium (Ca), strontium (Sr), barium (Ba), and radium (Ra), and among these, magnesium and calcium are preferable since the nucleating agent effect of nucleating agent components is prominent.

Among the compounds represented by the following General Formula (1), a compound in which m is 1 is preferable. In addition, a compound in which $R^1$, $R^2$, $R^3$, and $R^4$ contain one group selected from the group consisting of a methyl group, an ethyl group, a sec-butyl group, and a tert-butyl group is preferable. In addition, a compound in which $R^5$ is a hydrogen atom or a methyl group is particularly preferable.

As the compound represented by the following General Formula (1), those containing one or two or more compounds represented by any one of the following chemical formulae (2) to (13) are preferable. Among these, from a viewpoint of improving physical properties of a resin, a compound represented by any one of chemical formulae (2) to (6) is preferable. From a viewpoint of improving transparency, a compound represented by any one of chemical formulae (7) to (13) is preferable.

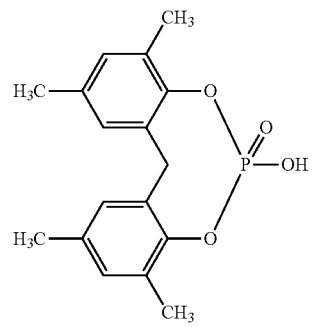
(2)

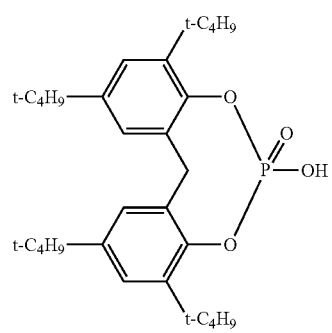
(3)

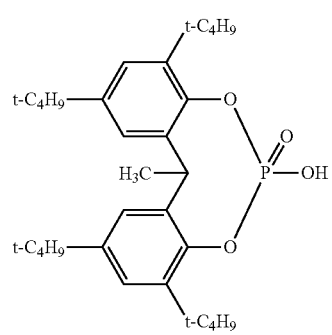
(4)

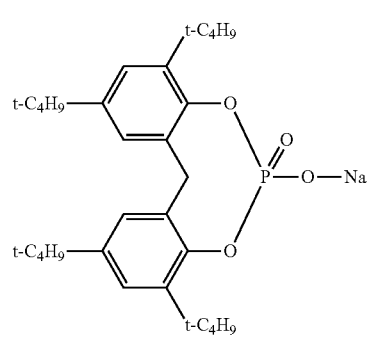
(5)

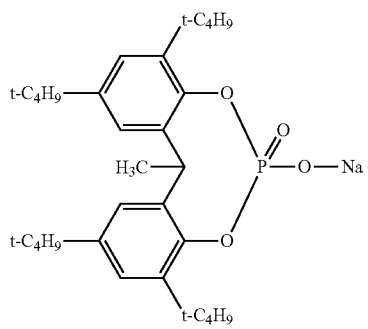

(6)

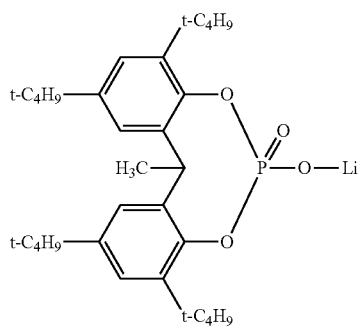

(7)

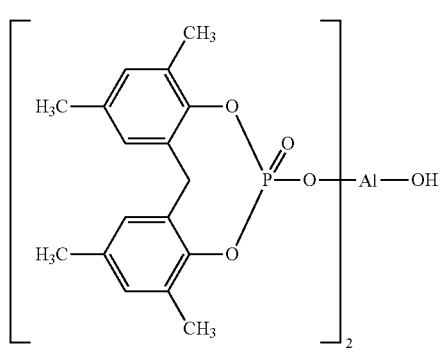

(8)

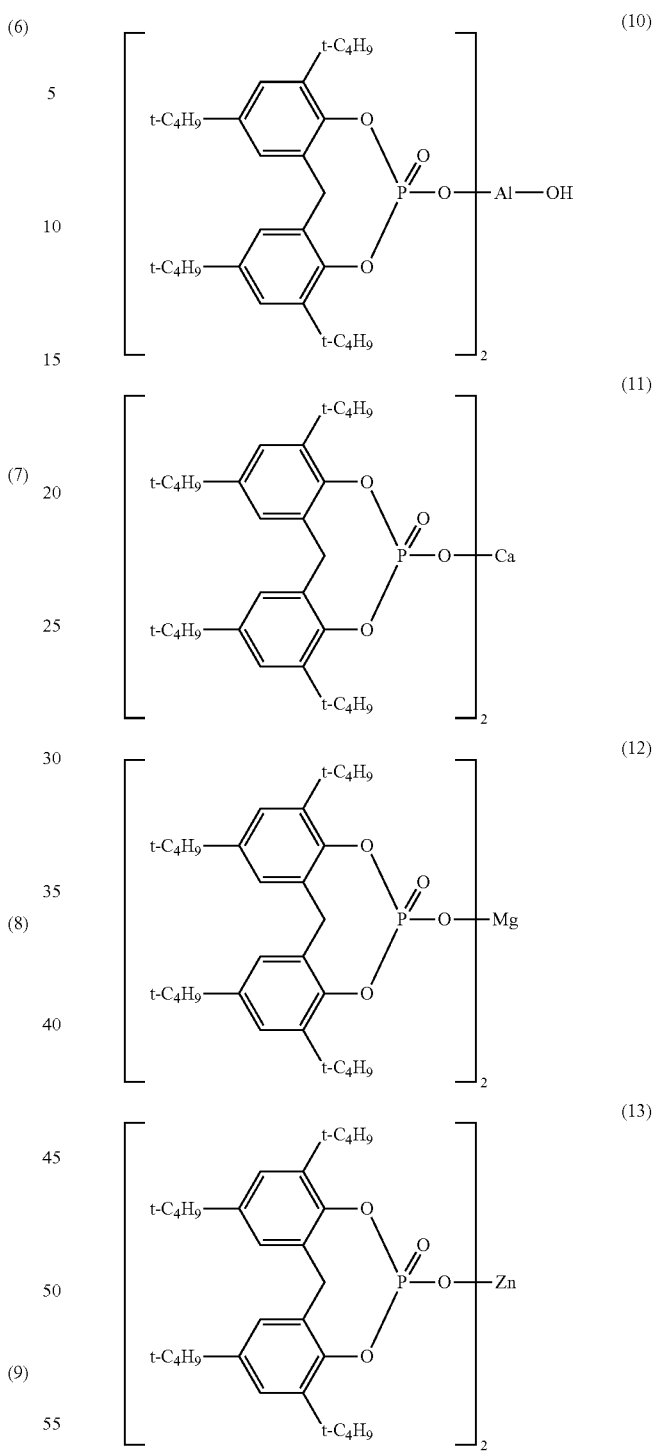

As a method of producing the compound represented by the General Formula (1), phosphorus trichloride (or phosphorus oxychloride) is reacted with 2,2′-alkylidene phenol, and the hydrolysis is performed depending on the necessity to produce a cyclic acidic phosphate. Subsequently, the cyclic acidic phosphate is reacted with a metal hydroxide such as sodium hydroxide and potassium hydroxide, the obtained reactant is appropriately purified (filtered and the like) and dried to obtain the compound (aromatic phosphate metal salt). In addition, the aromatic phosphate metal salt may be synthesized by a known method in the related art and used as the compound.

In addition, the obtained compound is dissolved in a solvent, reacted with other metal hydroxides such as lithium hydroxide, or reacted with any salt of aluminum, magnesium, and a group 2 element, and the obtained reactant is purified and dried to obtain another compound.

A particulate nucleating agent of the present embodiment is obtained by grinding the obtained compound using appropriate grinding means, depending on the necessity. In the particulate nucleating agent, coarse particles may be removed by being sieved with a sieve of a predetermined mesh size. In addition, the particulate nucleating agent can include one or two or more powdery compounds. For example, two or more compounds having different particle diameter distribution, or classified two or more compounds may be combined and blended with one another at an appropriate proportion to obtain the particulate nucleating agent.

Examples of the grinding means include mortar, ball mill, rod mill, tube mill, conical mill, vibratory ball mill, Hyswing ball mill, roller mill, pin mill, hammermill, attrition mill, jet mill, jet miser, micronizer, nanomiser, majac mill, microatomizer, colloid mill, premier colloid mill, micron mill, Charlotte colloid mill, rotary cutter, dry medium stirring mill, and the like. These grinding machines can be used alone or two or more can be used in combination. In addition, these machines are appropriately selected depending on the type of the raw material powder to be ground, the grinding time, or the like.

The particulate nucleating agent of the present embodiment may be constituted of only the compound represented by General Formula (1), or may contain other components within a range of achieving the object of the present invention. Examples of the other components include aromatic phosphate metal salts other than the compound represented by General Formula (1), fatty acid metal salts, silicic acid-based inorganic additive components, hydrotalcites, and the like. These may be used alone or two or more can be used by being combined together.

As the fatty acid metal salt, those containing a compound represented by the following General Formula (14) are preferable.

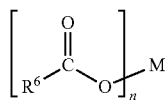
(14)

In General Formula (14), $R^6$ represents a straight chain or branched aliphatic group having 9 to 30 carbon atoms, M represents a metal atom, and n represents an integer of 1 to 4, which is an integer corresponding to the valence of metal atoms of M.

In General Formula (14), $R^6$ is a straight chain or branched aliphatic group having 9 to 30 carbon atoms, and examples thereof include an alkyl group and an alkenyl group having 9 to 30 carbon atoms. This may be substituted with a hydroxyl group.

Examples of the aliphatic group having 9 to 30 carbon atoms include saturated fatty acids such as capric acid, 2-ethylhexane acid, undecylic acid, lauric acid, tridecylic acid, myristic acid, pentadecylic acid, palmitic acid, margaric acid, stearic acid, nonadecylic acid, arachidic acid, hexosyl acid, behenic acid, tricosylic acid, lignoceric acid, cerotic acid, montanoic acid, and melissic acid, straight chain unsaturated fatty acids such as 4-decenoic acid, 4-dodecenoic acid, palmitoleic acid, α-linoleic acid, linoleic acid, γ-linolenic acid, stearidonic acid, petroselinic acid, oleic acid, elaidic acid, vaccenic acid, eicosapentaenoic acid, docosapentaenoic acid, and docosahexaenoic acid, and the like.

In the fatty acid metal salt, an aliphatic group represented by $R^6$ preferably has 10 to 21 carbon atoms. In particular, lauric acid, myristic acid, palmitic acid, stearic acid, behenic acid, oleic acid, and 12-hydroxy stearic acid are preferable.

Examples of metal atom represented by M include alkali metal, magnesium, calcium, strontium, barium, titanium, manganese, iron, zinc, silicon, zirconium, yttrium, barium, hafnium, and the like. Among these, alkali metal such as sodium, lithium, and potassium is preferable, and in particular, sodium and lithium are preferably used since they raise the crystallization temperature.

Examples of the silicic acid-based inorganic additive components include fumed silica, fine particle silica, silica stone, diatomaceous earth, clay, kaoline, silica gel, calcium silicate, sericite, kaolinite, flint, feldspar flour, vermiculite, attapulgite, talc, mica, minnesotite, pyrophyllite, and the like, and among these, those of which particle structure is a layered structure and of which silicon content is 15% by mass or more are preferable. Examples of the preferable inorganic additive include sericite, kaolinite, talc, mica, minnesotite, pyrophyllite, and the like, and talc and mica are more preferable.

The hydrotalcites may be natural products or synthetic products, and can be used regardless of presence or absence of surface treatment or presence or absence of water of crystallization. Examples of the hydrotalcites include basic carbonate represented by the following General Formula.

(In General Formula, M represents alkali metal or zinc, X represents a number of 0 to 6, y represents a number of 0 to 6, z represents a number of 0.1 to 4, p represents the valence of M, and n represents a number of 0 to 100 of water of crystallization)

The particulate nucleating agent containing the other components is a particulate nucleating agent composition containing the compound represented by General Formula (1), and is obtained by being constituted to contain one or more selected from the group consisting of other aromatic phosphate metal salts, fatty acid metal salts, silicic acid-based inorganic additive components, and hydrotalcites, preferably one or more selected from the group consisting of fatty acid metal salts, talc, mica, and hydrotalcites.

Such a particulate nucleating agent is obtained by grinding treatment by appropriately combining the grinding means in the co-presence of the compound represented by General Formula (1) and other components, for example. In addition, the grinding means, sieving, blending method, and the like can be used.

The particulate nucleating agent of the present embodiment functions as a nucleating agent/clarifying agent added at the time of molding process of a thermoplastic resin such as a crystalline polymer. In the crystalline polymer, it is possible to realize improvement (modifying effect) in the crystallization temperature, the thermal modification temperature, the flexural modulus, the hardness, the clarity, or the like. In addition, it is possible to enhance molding cycle properties and to improve productivity.

The particulate nucleating agent of the present embodiment has a property in which a content of aliphatic amine in the particulate nucleating agent obtained by measurement of Procedure A shown below is equal to or more than 3 ppm and equal to or less than 190 ppm based on a mass of the entirety of the particulate nucleating agent.

(Gist of Procedure A)

The particulate nucleating agent is heated at 180° C. for 2 hours in an argon gas atmosphere, and a generated vaporized matter is collected in a methane sulfonic acid aqueous solution.

Subsequently, a concentration of the aliphatic amine in the methane sulfonic acid aqueous solution is measured using an ion chromatography, and a content (ppm) of the aliphatic amine based on a mass of the entirety of the particulate nucleating agent is calculated based on the obtained measurement value.

According to the finding of the present inventors, it was recognized that it is possible to appropriately control feed reliability and odorous properties of the particulate nucleating agent by using the content of the aliphatic amine in the particulate nucleating agent as an index. That is, it was apparent that it is possible to enhance feed reliability of the particulate nucleating agent by setting the content of the aliphatic amine to be equal to or more than a predetermined value, and it is possible to reduce odor of the particulate nucleating agent by setting the content of the aliphatic amine to be equal to or less than a predetermined value.

By enhancing feed reliability of the particulate nucleating agent, it is possible to enhance production reliability of the molding process using the particulate nucleating agent. With this, it is expected that an allowable range of powder physical properties of the particulate nucleating agent is widened in application to the molding process or use in a nucleating agent/clarifying agent.

In addition, by realizing a particulate nucleating agent excellent in low odorous properties, it is possible to improve workability at the time of storage or molding process of the particulate nucleating agent. With this, handleability of the particulate nucleating agent is enhanced over production, packaging, transfer, storage, and molding process of the particulate nucleating agent.

In addition, according to the finding of the present inventors, it was apparent that it is possible to reliably evaluate the content of the aliphatic amine in the particulate nucleating agent by employing a heating temperature higher than a boiling point of the aliphatic amine as a measurement condition of the aliphatic amine and by appropriately selecting a heating time.

A measurement amount of the aliphatic amine was also increased by prolonging the heating time, but after 2 hours, a saturation amount was shown for a while, and the measurement amount was increased again after 2.5 hours. After 2.5 hours, not only the aliphatic amine but also impurities were started to be measured, and it was understood that a measurement amount of the impurities was increased. The impurities were estimated as a decomposed product of the aliphatic amine.

Here, by setting the heating time to be 2 hours, it is possible to suppress detection of impurities which is a measurement target and to measure a sufficient amount close to the saturation amount of the aliphatic amine which is a non-measurement target. In addition, it was understood that by setting such a measurement condition, reproducibility of the content of the aliphatic amine was also excellent.

Specific examples of Procedure A are shown as follows.

4 g of a particulate nucleating agent is introduced into a test tube for particulate nucleating agent introduction made of glass (outer diameter 30 mm×length 200 mm).

Argon gas (Ar) is introduced into the test tube for particulate nucleating agent introduction under a condition of 37 mL/min for 5 minutes, and then while introducing argon gas at 37 mL/min (in an argon gas atmosphere), the test tube for particulate nucleating agent introduction is heated under a condition of 180° C. and 2 hours.

A vaporized matter generated by heating is collected in 6 mL of a 600 mg/L methane sulfonic acid aqueous solution in a collection test tube made of glass (outer diameter 15 mm×length 150 mm). 6 mL of the methane sulfonic acid aqueous solution is messed up to 10 mL with a 600 mg/L methane sulfonic acid aqueous solution to prepare a measurement sample.

A concentration or species of the aliphatic amine in the obtained measurement sample is measured by using an ion chromatography method.

A content (ppm) of the aliphatic amine based on a mass of the entirety of the particulate nucleating agent is calculated based on the obtained measurement value.

According to the finding of the present inventors, by this, it is possible to suppress variation of a detection amount of the aliphatic amine by selecting appropriately the test tube size, the amount of the particulate nucleating agent, the species, the concentration, and the amount of a collection solution, and by controlling the flow rate of argon, the heating time and the heating temperature. Among these, it is considered that variation of collection efficiency of the aliphatic amine would be suppressed by setting a flow amount of argon gas to be equal to or more than a predetermined amount at the time of collection of volatile matter.

In the present embodiment, a lower limit value of the content of the aliphatic amine is equal to or more than 3 ppm, preferably equal to or more than 4 ppm, and further more preferably equal to or more than 5 ppm, for example, based on a mass of the entirety of the particulate nucleating agent. With this, it is possible to enhance feed reliability of the particulate nucleating agent. Detailed mechanisms are not determined, but it is considered that since the aliphatic amine in the particulate nucleating agent improves a degree of sliding of the particulate bodies, clogging at the time of feed is suppressed and feed reliability is enhanced.

An upper limit value of the content of the aliphatic amine is equal to or less than 190 ppm, preferably equal to or less than 180 ppm, and furthermore preferably equal to or less than 150 ppm, for example, based on a mass of the entirety of the particulate nucleating agent. With this, a particulate nucleating agent having excellent low odorous properties can be realized.

The aliphatic amine means a compound in which 1 to 3 hydrogen atoms of ammonia are substituted with a hydrocarbon residue R and R is a hydrocarbon group or a substitute of a hydrocarbon group. A part of the hydrocarbon group may be substituted with an oxygen atom or the like. The aliphatic amine is a compound different from aromatic amine from a viewpoint of not containing an aromatic substance in all R.

The aliphatic amine may be any one of primary amine, secondary amine, and tertiary amine.

The aliphatic amine can include an amine compound having 1 to 3 monovalent groups having 1 to 6 carbon atoms bonded to a nitrogen atom. That is, the number of carbon atoms of the hydrocarbon residue R in the aliphatic amine is, for example, 1 to 6, preferably 2 to 5, and more preferably 2 to 4. It is possible to improve feed reliability by selecting the appropriate number of carbon atoms.

In addition, examples of the hydrocarbon residue or a substitute thereof represented by R include an alkyl group, an alcoholic hydroxy group, and the like.

As the aliphatic amine, for example, aliphatic primary amines such as methylamine, ethylamine, propylamine, isopropylamine, butylamine, isobutylamine, tert-butylamine, amylamine, hexylamine, palmitylamine, ethylenediamine, and monoethanolamine; aliphatic secondary amines such as dimethylamine, diethylamine, dipropylamine, dibutylamine, diamylamine, and diethanolamine; aliphatic tertiary amines such as trimethylamine, triethylamine, tripropylamine, tributylamine, triamylamine, N,N-dimethylamine, and the like are used.

The aliphatic amine preferably includes alkylamine or alkanolamine, for example. With this, it is possible to improve feed reliability and low odorous properties. Among these, from a viewpoint of production reliability of the particulate nucleating agent, as the aliphatic amine, one or more aliphatic amines selected from the group consisting of triethylamine, diethylamine, butylamine, and ethanolamine is preferable.

In the present embodiment, it is possible to control the content of the aliphatic amine by appropriately selecting the species or the mixture amount of each component contained in the particulate nucleating agent, synthesis and preparation method of the particulate nucleating agent, or the like, for example. Among these, for example, using aliphatic amine in filtration, washing, and purifying steps, grinding, classification, and blending steps, and a preparation step of a particulate nucleating agent or the like are exemplified as an element to set the content of the aliphatic amine within a desired numerical value range.

A production method of the particulate nucleating agent of the present embodiment can include a step of preparing a particulate nucleating agent, a step of acquiring a content of aliphatic amine based on a mass of the entirety of the particulate nucleating agent based on Procedure A, and a step of selecting a particulate nucleating agent, of which the content of the aliphatic amine is within the numerical value range, as an acceptable product. With this, a particulate nucleating agent excellent in feed reliability and low odorous properties can be realized.

A resin composition of the present embodiment is a resin composition containing the particulate nucleating agent in a thermoplastic resin.

A method of adding the particulate nucleating agent to the thermoplastic resin is not particularly limited, and a generally used method can be applied as it is. For example, it is possible to use a method of dry blending a powder product or pellet of the thermoplastic resin and a powder product of the particulate nucleating agent together.

The resin composition can be used in various forms. For example, the form may be any of pellet form, granule form, and powder form. From a viewpoint of handleability, the pellet form is preferable.

Examples of the thermoplastic resin include a polyolefin-based resin, a styrene-based resin, a polyester-based resin, a polyether-based resin, a polycarbonate-based resin, a polyamide-based resin, a halogen-containing resin, and the like. Among these, a crystalline polymer is preferably used.

In addition, examples of the thermoplastic resin include a thermoplastic resin such as petroleum resin, coumarone resin, polyvinyl acetate, acrylic resin, polymethyl methacrylate, polyvinyl alcohol, polyvinyl formal, polyvinyl butyral, polyphenylene sulfide, polyurethane, fibrous resin, polyimide resin, polysulfone, liquid crystal polymer, and the like and the blended product thereof.

In addition, the thermoplastic resin may be a thermoplastic elastomer such as isoprene rubber, butadiene rubber, acrylonitrile-butadiene copolymer rubber, styrene-butadiene copolymer rubber, polyester-based elastomer, nitrile-based elastomer, nylon-based elastomer, vinyl chloride-based elastomer, polyamide-based elastomer, polyurethane-based elastomer, or the like, or these may be used in combination.

The crystalline polymer is not particularly limited, and examples thereof include a polyolefin-based polymer such as polypropylene, high-density polyethylene, low-density polyethylene, straight chain low-density polyethylene, polybutene-1, poly3-methylpentene, poly4-methylpentene, α-olefin polymer such as ethylene/propylene block or random copolymer, and the like; thermoplastic straight chain polyester-based polymer such as polyethylene terephthalate, polybutylene terephthalate, polyhexamethylene terephthalate, and the like; polysulfide-based polymer such as polyphenylene sulfide and the like; polylactic acid-based polymer such as polycaprolactone and the like; straight chain polyamide-based polymer such as polyhexamethylene adipamide and the like; crystalline polystyrene-based polymer such as syndiotactic polystyrene and the like; and the like.

Among these, the polyolefin-based polymer which prominently exhibits the use effect of the nucleating agent of the present invention is preferable, and a polypropylene-based resin such as polypropylene, ethylene/propylene block or random copolymer, α-olefin other than ethylene/propylene block or random copolymer, a mixture of the propylene-based polymer and other α-olefin polymer, and the like is particularly preferable.

It is useful in a case where the polypropylene-based polymer such as crystalline α-olefin polymer, particularly, a polypropylene-based resin such as polypropylene, ethylene/propylene copolymer, and a mixture of the propylene polymer and other α-olefin polymer is used as the crystalline polymer. The polypropylene-based resin can be used regardless of the extreme viscosity, the isometactic pentad fraction, the density, the molecular weight distribution, the melt flow rate, the rigidity, or the like. For example, the polypropylene-based resin can be also appropriately used as disclosed in Japanese Unexamined Patent Publication No. 63-37148, Japanese Unexamined Patent Publication No. 63-37152, Japanese Unexamined Patent Publication No. 63-90552, Japanese Unexamined Patent Publication No. 63-210152, Japanese Unexamined Patent Publication No. 63-213547, Japanese Unexamined Patent Publication No. 63-243150, Japanese Unexamined Patent Publication No. 63-243152, Japanese Unexamined Patent Publication No. 63-260943, Japanese Unexamined Patent Publication No. 63-260944, Japanese Unexamined Patent Publication No. 63-264650, Japanese Unexamined Patent Publication No. 1-178541, Japanese Unexamined Patent Publication No. 2-49047, Japanese Unexamined Patent Publication No. 2-102242, Japanese Unexamined Patent Publication No. 2-251548, Japanese Unexamined Patent Publication No. 2-279746, Japanese Unexamined Patent Publication No. 3-195751, and the like.

A content of the particulate nucleating agent can be generally within a range of 0.001 to 10 parts by weight, preferably 0.005 to 8 parts by weight, and more preferably 0.01 to 5 parts by weight, with respect to 100 parts by weight of the thermoplastic resin (for example, crystalline polymer). With this, it is possible to sufficiently obtain the effect of modifying the thermoplastic resin, particularly the crystalline polymer.

The resin composition of the present embodiment can contain an additive such as anti-oxidant, photostabilizer, ultraviolet absorbing agent, pigment, filler, organic tin compound, plasticizer, epoxy compound, foaming agent, anti-static agent, flame retardant, lubricant, heavy metal deactivator, hydrotalcites, organocarboxylic acid, coloring agent, silicic acid-based additive, and processing aid. These may be used alone or two or more thereof may be used in combination.

Examples of the anti-oxidant include a phosphorus-based anti-oxidant, a phenol-based anti-oxidant, a thioether-based anti-oxidant, and the like.

Examples of the anti-static agent include a cationic surfactant, an anionic surfactant, a nonionic surfactant, an ampholytic surfactant, and the like.

Examples of the flame retardant include a halogen-based compound, a phosphate compound, an amide phosphate compound, a melamine-based compound, a melamine salt compound of polyphosphate, a fluorine resin, a metal oxide, and the like.

Examples of the lubricant include a hydrocarbon-based lubricant, a fatty acid-based lubricant, an aliphatic alcohol-based lubricant, an aliphatic ester-based lubricant, an aliphatic amide-based lubricant, a metal soap-based lubricant, and the like.

Examples of the silicic acid-based additive include fume silica, fine particle silica, silica stone, diatomaceous earth, clay, kaoline, silica gel, calcium silicate, sericite, kaolinite, flint, feldspar flour, vermiculite, attapulgite, talc, mica, minnesotite, pyrophyllite, and the like.

A content of the additive in the resin composition is preferably 0.001 to 10 parts by weight, for example, with respect to 100 parts by weight of a crystalline polymer. By setting the content of the additive to be within such a numerical value range, the effect of the additive is improved.

The resin composition can be used in a molded product such as injection molded product, fiber, flat yarn, biaxially stretched film, uniaxially stretched film, non-stretched film, sheet, thermoformed product, extrusion blow-molded product, injection blow-molded product, injection stretching blow-molded product, profile extrusion-molded product, rotationally molded product, and the like. Among these, the injection molded product, the film, the sheet, and the thermoformed product are preferable as the molded product.

The method of producing the molded product of the present embodiment includes a step of molding a resin composition based on various molding methods. With this, it is possible to obtain the molded product.

The molding method is not particularly limited, and examples thereof include an injection molding method, an extrusion molding method, a blow molding method, a rotational molding method, a vacuum molding method, an inflation molding method, a calendar molding method, a slush molding method, a dip molding method, a foaming molding method, and the like. Among these, the injection molding method, the extrusion molding method, and the blow molding method are preferable.

The resin composition can be used in various uses such as construction materials, agricultural materials, components for vehicles such as automobiles, trains, ships, airplanes and the like, packaging materials, miscellaneous goods, toys, home appliances, medical supplies, and the like. Specifically, automobile components such as bumper, dashboard, instrument panel, battery case, luggage case, door panel, door trim, fender liner, and the like; resin components for home appliances such as refrigerator, washing machine, vacuum cleaner, and the like; household goods such as tableware, bottle cap, bucket, bathing article, and the like; resin components for connection such as connector and the like; miscellaneous goods such as toys, storage containers, synthetic paper, and the like; medical molded products such as medical pack, syringe, catheter, medical tube, syringe preparation, infusion solution bag, reagent container, medicine container, medicine unit packaging, and the like; building materials such as wall material, floor material, window frame, wall paper, window, and the like; wire coating materials; agricultural materials such as house, tunnel, flat yarn mesh bag, and the like; industrial materials such as pallet, pail can, backgrind tape, tape for liquid crystal protection, pipe, modified silicone polymer for sealing material, and the like; food packaging materials such as wrap, tray, cup, film, bottle, cap, preservation container, and the like; other 3D printer materials, separator film for battery, and the like. In addition, the resin composition can be used in uses in a case where various post-treatments are performed, for example, uses in a case where sterilization by radiation is performed such as medial use and food packaging use, uses in a case where low-temperature plasma treatment and the like are performed after molding in order to improve surface properties such as coating properties, or the like. Among these, the resin composition is preferably used in automobile components, household goods, and food packaging materials.

EXAMPLES

Hereinafter, the present invention will be described in detail with reference to examples. However, the present invention is not limited to the descriptions of the examples.
<Synthesis of Compound>
(Synthesis of Compound No. 1)

425 g of 2,2'-methylene bis[4,6-bis(1,1-dimethylethyl)] phenol, 161 g of phosphorus oxychloride, and 24 g of triethylamine were put and stirred at 50° C. for 3 hours. Subsequently, an aqueous solution of 40 g of sodium hydroxide and methanol were put and stirred at room temperature for 1 hour. The resultant product was dried under reduced pressure to obtain 421 g of white powder. Acetone was added to the obtained white powder and stirred at room temperature for 1 hour. Filtration was performed, acetone was removed, and the resultant product was dried under reduced pressure to obtain Compound No. 1.

Compound No. 1

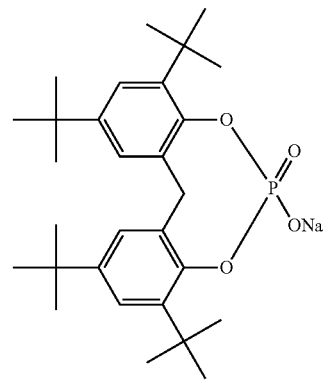

(Synthesis of Compound No. 2)

508 g (1 mol) of white powder obtained in <Synthesis of Compound No. 1> was dissolved in methanol, an aqueous solution of 24 g (1 mol) of lithium hydroxide was added thereto, and the resultant product was stirred at room temperature for 1 hour. A precipitate was filtered, and the residue was washed with water to reach a pH of 8, and dried under reduced pressure to obtain 410 g of white powder. The obtained white powder was ground using a dry medium stirring mill to obtain Compound No. 2.

Compound No. 2

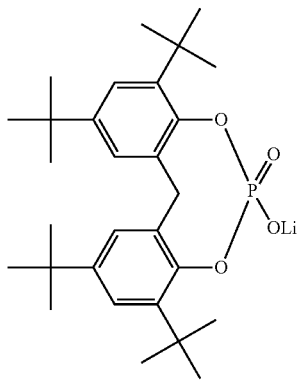

(Synthesis of Compound No. 3)

10.2 g (0.02 mol) of white powder obtained in <Synthesis of Compound No. 1> was dissolved in methanol, and an aqueous solution of 2.41 g (0.01 mol) of aluminum sulfate was dropped while stirring at 40° C. After dropping was finished, the resultant product was stirred under methanol reflux for 4 hours and cooled to room temperature. A precipitate was filtered, and the filtered residue was repeatedly washed with water, and dried under reduced pressure to obtain 9.63 g of white powder. The obtained white powder was ground using a pin mill to obtain Compound No. 3.

Compound No. 3

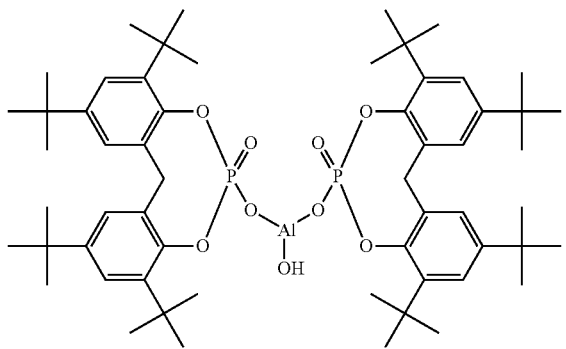

The obtained Compound No. 1 was ground in mortar to obtain a particulate nucleating agent A (amine amount: 0 ppm).

50 g of the obtained particulate nucleating agent A and 25 mg of triethylamine (TEA) were mixed with each other to obtain a particulate nucleating agent B (amine amount: 500 ppm).

6 g of the particulate nucleating agent B and 14 g of the particulate nucleating agent A were mixed with each other to obtain a particulate nucleating agent C (amine amount: 150 ppm).

10 g of the particulate nucleating agent B and 40 g of the particulate nucleating agent A were mixed with each other to obtain a particulate nucleating agent D (amine amount: 100 ppm).

4 g of the particulate nucleating agent D and 36 g of the particulate nucleating agent A were mixed with each other to obtain a particulate nucleating agent E (amine amount: 10 ppm).

10 g of the particulate nucleating agent E and 10 g of the particulate nucleating agent A were mixed with each other to obtain a particulate nucleating agent F (amine amount: 5 ppm).

40 g of the obtained particulate nucleating agent A and 10 mg of diethylamine (DEA) were mixed with each other to obtain a mixture product (amine amount: 250 ppm). 5 g of the obtained mixture product and 15 g of the particulate nucleating agent A were mixed with each other to obtain a particulate nucleating agent G (amine amount: 50 ppm).

40 g of the obtained particulate nucleating agent A and 10 mg of butylamine (BA) were mixed with each other to obtain a mixture product (amine amount: 250 ppm). 5 g of the obtained mixture product and 15 g of the particulate nucleating agent A were mixed with each other to obtain a particulate nucleating agent H (amine amount: 50 ppm).

40 g of the obtained particulate nucleating agent A and 10 mg of ethanolamine (MEA: monoethanolamine) were mixed with each other to obtain a mixture product (amine amount: 250 ppm). 5 g of the obtained mixture product and 15 g of the particulate nucleating agent A were mixed with each other to obtain a particulate nucleating agent I (amine amount: 50 ppm).

40 g of the obtained Compound No. 2 and 10 mg of triethylamine were mixed with each other to obtain a mixture product (amine amount: 250 ppm). 5 g of the obtained mixture product and 15 g of the obtained Compound No. 2 were mixed with each other to obtain a particulate nucleating agent J (amine amount: 50 ppm).

40 g of the obtained Compound No. 3 and 10 mg of triethylamine were mixed with each other to obtain a mixture product (amine amount: 250 ppm). 5 g of the obtained mixture product and 15 g of the obtained Compound No. 3 were mixed with each other to obtain a particulate nucleating agent K (amine amount: 50 ppm).

100 g of the obtained particulate nucleating agent A and 20 mg of triethylamine were mixed with each other to obtain a particulate nucleating agent L (amine amount: 200 ppm).

The amine amount shows a result obtained by the following measurement of amine amount.

<Measurement of Amine Amount>

Contents of amine in the obtained particulate nucleating agents A to L were measured by the following Procedures (1) to (4). The result is shown in Table 1.

As shown in FIG. 1 of (1), 4 g of the obtained particulate nucleating agent 10 was weighed and put into a test tube 20 made of glass (test tube for particulate nucleating agent introduction, outer diameter 30 mm×length 200 mm, manufactured by Nichidenrika-Glass Co., Ltd.), and the opening of the test tube 20 was tightly sealed with a cap 30 (rubber stopper). 600 mg/L of a methane sulfonic acid aqueous solution 50 was put into another test tube 40 made of glass (collection test tube, outer diameter 15 mm×length 150 mm, manufactured by Nichidenrika-Glass Co., Ltd.) by 6 mL, and the opening of the test tube 40 was tightly sealed with a cap 60 (rubber stopper).

Subsequent to (2), as shown in FIG. 1, a test tube 20 was installed in a block bus 100, two tubes 70, 80 were inserted into a cap 30 of the test tube 20, and tubes 80, 90 were inserted into a cap 60 of the test tube 40. An end of the tube 80 was positioned in the test tube 20, and the other end of the tube 80 was positioned in a methane sulfonic acid aqueous solution 50 of the test tube 40.

Subsequent to (3), argon gas (Ar) was introduced into the test tube 20 from the other end of the tube 70 under a condition of flow rate: 37 mL/min for 5 minutes, while introducing argon gas under the same condition, in argon gas atmosphere, the test tube 20 was heated under a condition of 180° C. and 2 hours using the block bus 100, and the vaporized matter generated was collected in a methane sulfonic acid aqueous solution 50 in the test tube 40 via the tube 80 to obtain a collection solution in which the vaporized matter was collected.

After (4), 6 mL of the obtained collection solution (methane sulfonic acid aqueous solution 50) was messed up to 10 mL with 600 mg/L of a methane sulfonic acid aqueous solution, and this was set as a measurement target.

Using an ion chromatography method under the following measurement condition, the species of amine and the amounts of amine (concentration) in the obtained measurement target were measured. The amine amount (ppm) was measured for using three measurement targets, and an average of the three measurement values was acquired.

Based on the obtained measured value of the amine amount, a content (ppm) of amine was calculated based on a mass of the entirety of the particulate nucleating agent.
(Measurement Condition)

Measurement device: Ion chromatograph ICS-2000 (Thermofischer Scientific Co., Ltd.)

Column: Dionex IonPac CS-17 (Thermofischer Scientific Co., Ltd.)

Detector: Electrical conductivity detector

Detection condition: 2.0 mmol/L of methane sulfonic acid aqueous solution (0 minute)→20.0 mmol/L of methane sulfonic acid aqueous solution (33 minutes). A concentration of a methane sulfonic acid aqueous solution (eluent) was changed as follows.

From 0 minute to 9 minutes: Gradient from 2.0 mmol/L to 4.0 mmol/L. From over 9 minutes to 18 minutes: Gradient from 4.0 mmol/L to 9.0 mmol/L.

From over 18 minutes to 28 minutes: Constant at 9.0 mmol/L.

From over 28 minutes to 33 minutes: A concentration was changed from 9.0 mmol/L to 20.0 mmol/L immediately after over 28 minutes, and was maintained constant thereafter.

Flow rate: 1.0 mL/min
Sample injection amount: 20 μL
Column temperature: 30° C.

In view of the measurement result of the amine amount, the obtained particulate nucleating agents C to K were used as particulate nucleating agents of Examples 1 to 9 in Table 1, and the obtained particulate nucleating agents A and L were used as particulate nucleating agents of Comparative Examples 1 and 2 in Table 1.

Particulate nucleating agents of Examples and Comparative Examples were evaluated based on the following evaluation items.

<Feed Reliability>

Using a powder property evaluation device (Seishin Enterprise Co., Ltd., Multi-tester MT-02), the obtained particulate nucleating agent was filled in a feeder of the powder property evaluation device by 10 g, and a discharge time in case the feeder is vibrated under a condition of feeder vibration width of 0.3 mm was measured. Three samples were measured for each particulate nucleating agent, and an average of three measurement values was set as a discharge time (s). The discharge time (s) measured was evaluated based on the following evaluation criteria. Results are shown in Table 1.

Discharge Time

A: A discharge time was small, and feed reliability was favorable.

B: During the measurement of a discharge time, operation was stopped after elapse of a predetermined time and feed reliability deteriorated.

In Table 1, ">60s" represents that there is no discharge after 60 seconds and the operation has been stopped.

<Odorous Properties>

Odorous properties in case of storing the obtained particulate nucleating agent as described below were evaluated based on the following criteria.

Storage: The odor of the particulate nucleating agent was checked after the obtained particulate nucleating agent was enclosed in a container, and stored at 25° C. and a humidity of 60% for 24 hours.

A: Odor was almost not sensed at the time of enclosure and after the opening (after storage) and was on the usable level without practical problem.

B: Odor after the opening (after storage) was stronger compared to that at the time of enclosure, and was on the level that a practical problem occurs.

<Clarifying Properties>

A composition obtained by mixing 0.1 parts by weight of the obtained particulate nucleating agent of each example with 100 parts by weight of polypropylene was mixed using a Henschel mixer for 1 minute, and extrusion processed under a condition of 230° C. and 150 rpm to produce a

TABLE 1

| | Example 1 | Example 2 | Example 3 | Example 4 | Example 5 | Example 6 | Example 7 | Example 8 | Example 9 | Comparative Example 1 | Comparative Example 2 |
|---|---|---|---|---|---|---|---|---|---|---|---|
| Particulate nucleating agent | F | E | D | C | G | H | I | J | K | A | L |
| Amine Species | TEA | TEA | TEA | TEA | DEA | BA | MEA | TEA | TEA | — | TEA |
| Content | 5 ppm | 10 ppm | 100 ppm | 150 ppm | 50 ppm | 50 ppm | 50 ppm | 50 ppm | 50 ppm | 0 ppm | 200 ppm |
| Feed reliability | A | A | A | A | A | A | A | A | A | B | A |
| | 7 s | 10 s | 10 s | 11 s | 5 s | 7 s | 10 s | 46 s | 34 s | >60 s | 12 s |
| Odorous properties | A | A | A | A | A | A | A | A | A | A | B |

In Table 1, TEA represents triethylamine, DEA represents diethylamine, BA represents butylamine, and MEA represents ethanolamine.

pellet. Haze (haze value: %) was measured based on JIS K7136 for a test piece having a thickness of 1 mm obtained by injection molding of the resultant pellet at 200° C.

It was recognized that the particulate nucleating agents of Examples 1 to 9 are excellent in feed reliability compared to that of Comparative Example 1, and odorous property thereof were decreased compared to that of Comparative Example 2.

In addition, it was shown that the particulate nucleating agents of Examples 1 to 9 have a small Haze value within a range in which there is no practical problem, and the particulate nucleating agents of Examples 1 to 11 have a smaller Haze value compared to that of Example 12. Such particulate nucleating agents can enhance transparency of a crystalline polymer. Therefore, it was recognized that the particulate nucleating agents can be appropriately used as a nucleating agent and a clarifying agent.

Priority is claimed on Japanese Patent Application No. 2018-127626, filed on Jul. 4, 2018, the content of which is incorporated herein by reference.

The invention claimed is:

1. A particulate nucleating agent comprising:
a compound represented by the following General Formula (1),
wherein a content of aliphatic amine in the particulate nucleating agent obtained by measurement of Procedure A shown below is equal to or more than 3 ppm and equal to or less than 190 ppm based on a mass of the entirety of the particulate nucleating agent and wherein procedure A comprises the following:
(Procedure A)
4 g of the particulate nucleating agent is put into a test tube for particulate nucleating agent introduction made of glass (outer diameter 30 mm×length 200 mm);
in the test tube for particulate nucleating agent introduction, argon gas is introduced under a condition of 37 mL/min for 5 minutes, and then while introducing argon gas at 37 mL/min, in an argon gas atmosphere, the test tube for particulate nucleating agent introduction is heated under a condition of 180° C. and 2 hours;
a vaporized matter generated by heating is collected in 6 mL of a 600 mg/L methane sulfonic acid aqueous solution in a collection test tube made of glass (outer diameter 15 mm×length 150 mm), the methane sulfonic acid aqueous solution is made up to 10 mL with a 600 mg/L methane sulfonic acid aqueous solution to prepare a measurement sample;
a concentration of aliphatic amine in the obtained measurement sample is measured by using an ion chromatography method;
a content (ppm) of the aliphatic amine based on a mass of the entirety of the particulate nucleating agent is calculated based on the obtained measurement value;

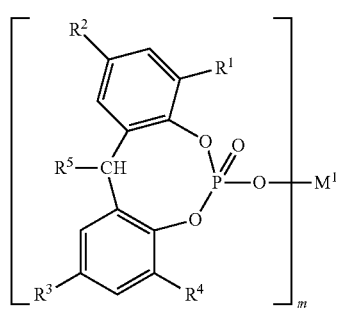

(1)

wherein, in General Formula (1), $R^1$ to $R^4$ each independently represent a hydrogen atom and a straight chain or branched alkyl group having 1 to 9 carbon atoms, $R^5$ represents a hydrogen atom or an alkyl group having 1 to 4 carbon atoms, m represents 1 or 2, in a case where m is 1, $M^1$ represents a hydrogen atom or an alkali metal atom, and in a case where m is 2, $M^1$ represents a group 2 element, Al (OH) or Zn.

2. The particulate nucleating agent according to claim 1, wherein the aliphatic amine includes an amine compound having 1 to 3 monovalent groups having 1 to 6 carbon atoms bonded to a nitrogen atom.

3. The particulate nucleating agent according to claim 1, wherein the aliphatic amine includes alkylamine or alkanolamine.

4. The particulate nucleating agent according to claim 1, wherein the aliphatic amine includes one or more selected from the group consisting of triethylamine, diethylamine, butylamine, and ethanolamine.

5. The particulate nucleating agent according to claim 1, wherein the compound includes one or two or more compounds represented by the following formulae (2) to (13)

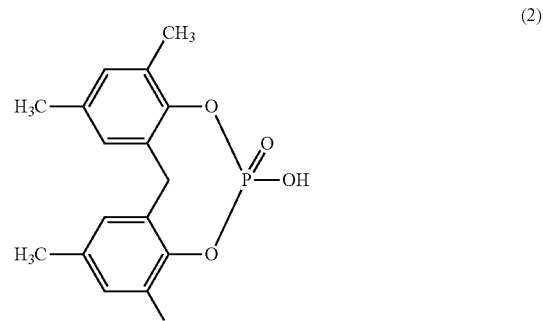

(2)

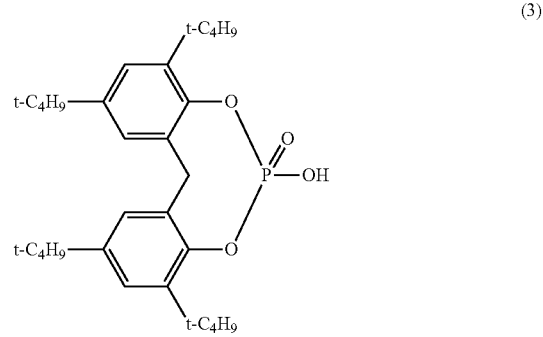

(3)

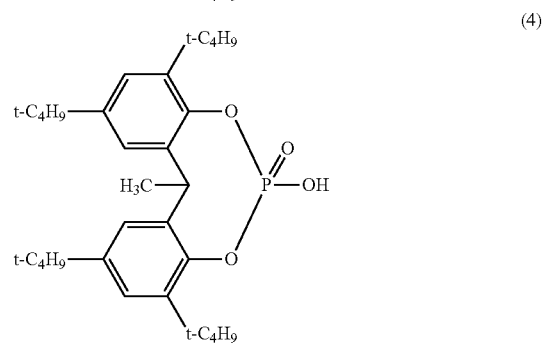

(4)

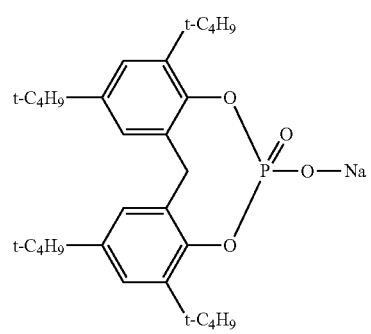
(5)
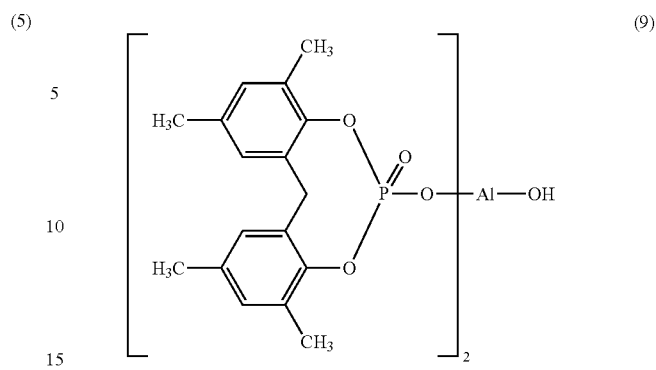
(9)
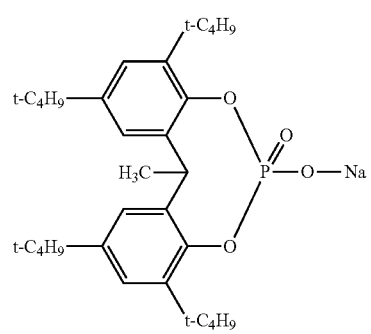
(6)
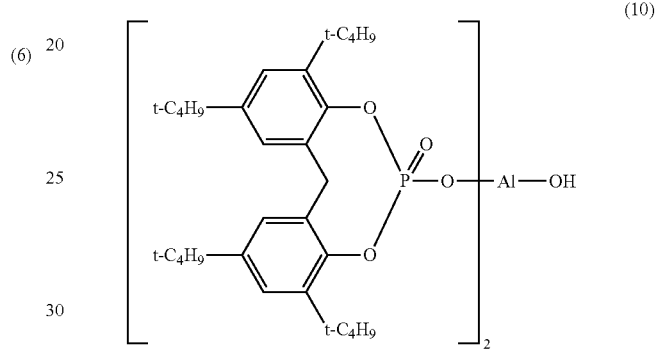
(10)
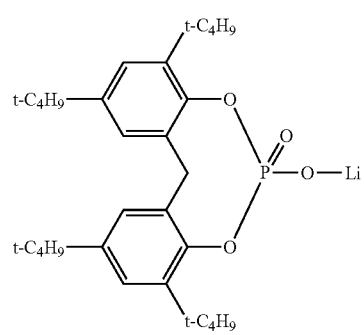
(7)
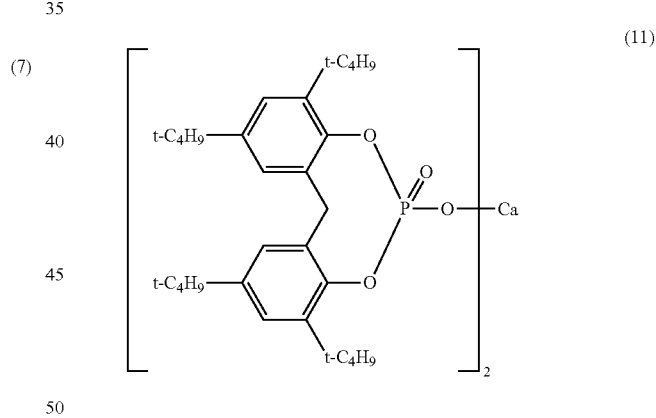
(11)
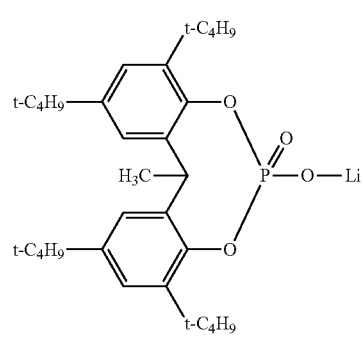
(8)
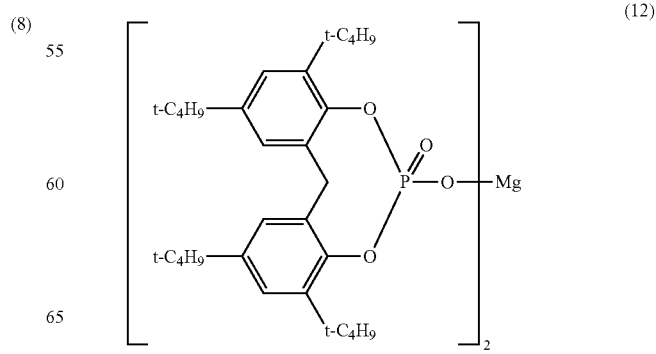
(12)

-continued

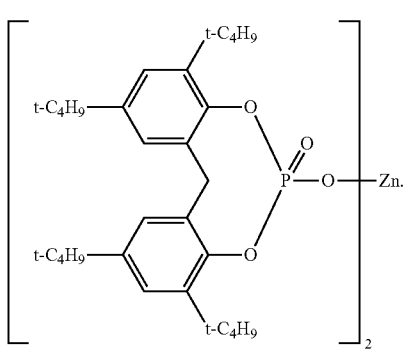

(13)

6. A resin composition comprising:
a thermoplastic resin which contains the particulate nucleating agent according to claim 1.

7. The resin composition according to claim 6,
wherein the thermoplastic resin includes a crystalline polymer.

8. The resin composition according to claim 7,
wherein the crystalline polymer includes a polyolefin-based polymer.

9. The resin composition according to claim 6,
wherein a content of the particulate nucleating agent is equal to or more than 0.001 parts by weight and equal to or less than 10 parts by weight with respect to 100 parts by weight of the thermoplastic resin.

10. The resin composition according to claim 6, which is in a pellet form.

11. A molded product obtained by using the resin composition according claim 6.

12. A production method of producing a molded product by using the resin composition according to claim 6.

* * * * *